May 29, 1956 J. M. MARKLEY Re. 24,156

VERTICALLY SWINGABLE WINDOW SASH

Original Filed June 30, 1949 3 Sheets-Sheet 1

INVENTOR

JAMES MONROE MARKLEY

BY Salvatore G. Militaro

ATTORNEYS

VERTICALLY SWINGABLE WINDOW SASH

Original Filed June 30, 1949 3 Sheets-Sheet 2

INVENTOR

JAMES MONROE MARKLEY

BY Salvatore G. Militana

ATTORNEYS

May 29, 1956 J. M. MARKLEY Re. 24,156
VERTICALLY SWINGABLE WINDOW SASH
Original Filed June 30, 1949 3 Sheets-Sheet 3
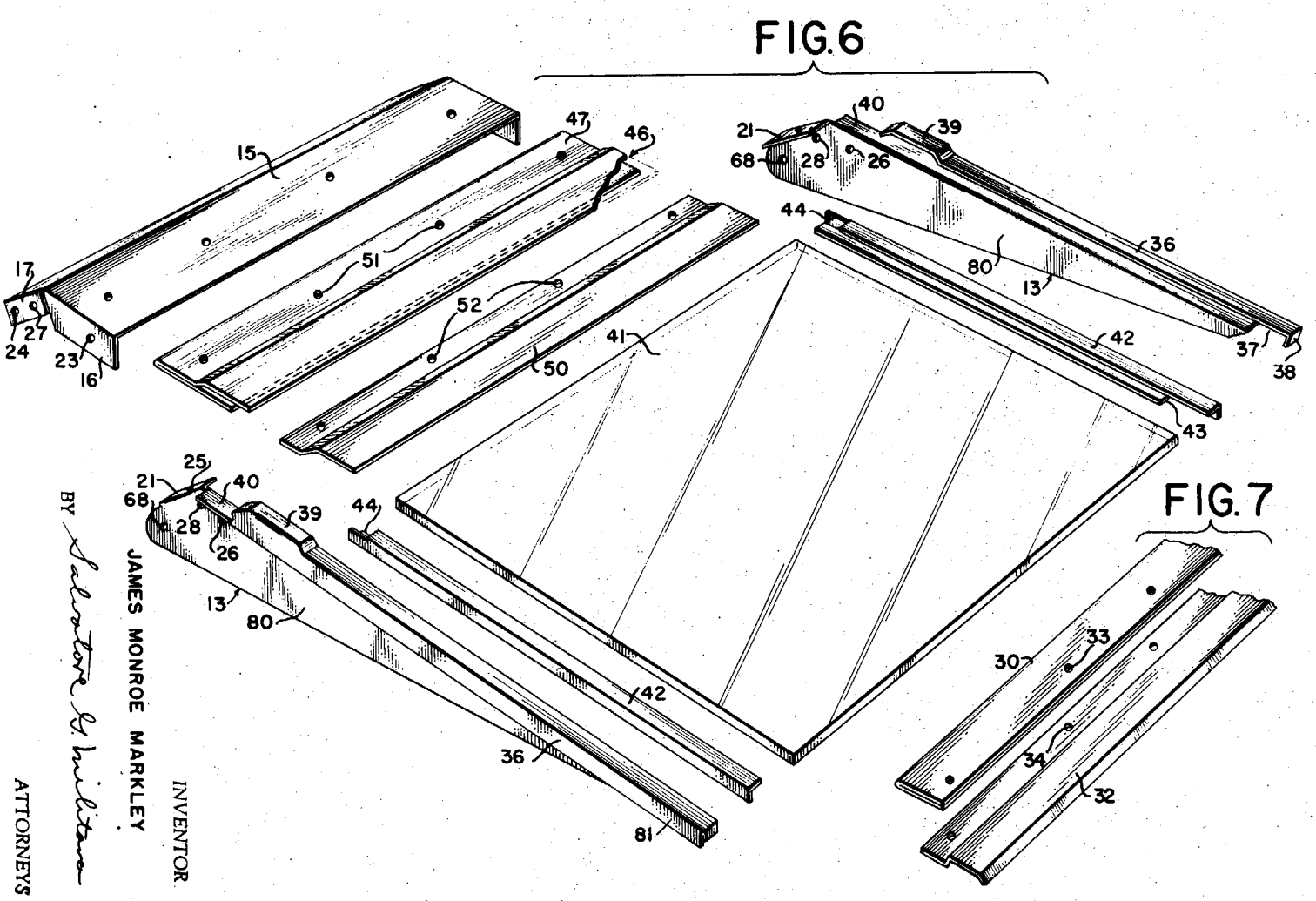
INVENTOR
JAMES MONROE MARKLEY
BY Salvatore G. Militaro
ATTORNEYS United States Patent Office Re. 24,156
Reissued May 29, 1956

24,156

VERTICALLY SWINGABLE WINDOW SASH

James Monroe Markley, Miami, Fla.

Original No. 2,684,735, dated July 27, 1954, Serial No. 102,371, June 30, 1949. Application for reissue July 7, 1955, Serial No. 520,640

11 Claims. (Cl. 189—62)

Matter enclosed in heavy brackets [ ] appears in the original patent but forms no part of this reissue specification; matter printed in italics indicates the additions made by reissue.

My invention relates to improvements in vertically swingable sash windows for dwellings and the like.

The primary object of the invention is to provide a weatherproof window with vertically spaced and swingable metal sash frames adapted to open upwardly and outwardly and which are rust-proof, non-corrosive, and especially designed to be manufactured at a lower cost than present-day metal sash frames and without expensive shop equipment.

Another object is to provide such a window with metal sash frames which will drain water and moisture out of the same so as to prevent the accumulation thereof at the bottoms of the sash frames with consequent rust corrosion, and leakage at the lower edges of the sashes.

Still another object is to provide a window of the character above set forth in which glass panes are sealed in metal sash frames and may be easily and quickly installed therein and replaced without the use of putty and the like.

Still another object is to provide a window of the character specified in which the sash frames and other parts may be inexpensively stamped out of sheet metal so as to avoid the use of expensive extrusions.

Still another object is to provide inexpensive, simply constructed operating means for easily and quickly opening and closing the upwardly swingable sashes.

Other and subordinate objects within the purview of my invention, together with the precise nature of my improvements, will be readily understood when the succeeding description and claims are read with reference to the drawings, accompanying and forming part of this specification.

In said drawings:

Figure 6 is a view in perspective of the parts of one of the sashes disassembled;

Figure 7 is a view in perspective of the sealing strip between the top of the uppermost sash and the window frame, together with the keeper and water shed bar therefor, detached and disassembled.

Figure 1:
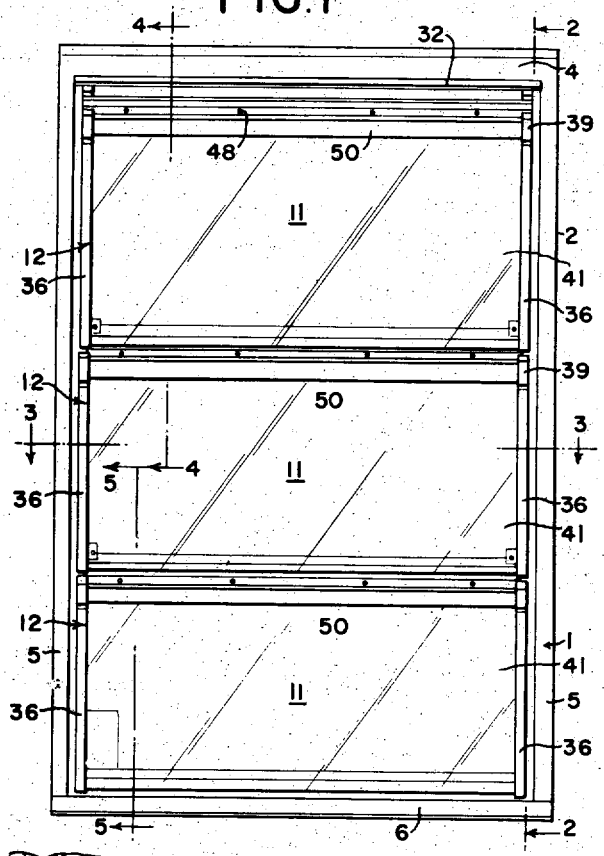
Figure 1 is a view in elevation of my improved window, in a preferred embodiment thereof, viewed from the outer side thereof with the sashes closed.

Referring now to the drawings by numerals, according to my invention, as illustrated, a window is provided comprising a window frame 1, preferably aluminum, suitably fitted and secured in the window opening 2 in a wall 3 and comprising a header 4, side stiles 5, and a sill member 6 preferably set against an inner shoulder 1 in the wall 3. A pair of flat side, stop ribs 8 extend vertically along the side stiles 5 and are spaced inwardly of the front of said frame 1 a distance suitable for a purpose presently seen. The sill member 6 is rabbeted along its upper, front edge to form a stop shoulder 9 on said member flush with the outer sides of the side stop ribs 8. A header rib 10 extends along the bottom and front edge of the header 4 between said ribs 8. The side stop ribs 8, stop shoulder 9, and header ribs 10 are preferably formed integrally with the window frame 1 and serve a particular purpose presently seen.

A plurality of vertically spaced sashes *or louvers* 11 are provided in the window frame 1 to open outwardly and upwardly, three being shown in the present instance, and which will now be described.

Each sash 11 comprises a sash frame 12 including a pair of substantially triangular, flat, *plate like* side frame members *or pivot clips* 13 of non-corrosive rustproof, sheet metal, preferably sheet aluminum, and which taper edgewise downwardly and are pivoted at the upper wider ends thereof, as by pivots 14, to the side stop ribs 8 in opposite sides of the window frame 1 to swing about an horizontal axis and lie flatwise against said ribs 8 when the sashes 11 are closed, but, with sufficient clearance to prevent frictional binding of the same against said ribs 8. Each pair of side frame members 13 at the upper ends thereof project inwardly of the window frame 1 past the side stop ribs 8 for a purpose presently apparent.

An upper stamped out cross bar 15, of obtuse angled cross section, and sheet aluminum, extends between and connects the upper ends of each pair of side frame members 13 and is secured thereto, flush with the upper and outer side edges of said members 13, by a pair of flanged ears 16, 17 on each end of said bar, one of the ears 16 of each pair being bolted, as at 18, to the adjacent side frame members 13, and the other ears 17 of each pair being bolted, as at 19, to a right angled edge flange 21 on the upper end of the adjacent side frame members 13. The ears 17 in each pair are also bolted, as at 22, to the adjacent side frame members 13. The pivots 14 extend through the ears 17 and the side frame members 13 of each sash frame 12 and may take the form of wooden screws, as shown, if the window frame 1 be formed of wood. Suitable bolt holes 23, 24 are provided in the ears 16, 17 and bolt holes 25, 26 in the flanges 21 and the side frame members 13, for the described bolts, and holes 27, 28 are provided in said ears 17 and the side frame members 13 for the pivots 14. The upper crossbar 15 of each sash frame 13 forms a downwardly and outwardly slanting top 29 for the sash frame for a particular purpose presently apparent.

A weatherproof seal is provided between the top 29 of the uppermost sash frame 12 and the window frame 1, to seal said sash frame at the top, when said sash frame 12 is closed. For this purpose, a double thickness felt, sealing strip 30 is attached by screws 31 to the bottom of the header rib 10 to extend along said rib and lie, when the sash frame 12 is closed, over and on the top 29 of said sash frame 12 to be clampingly engaged at its inner folded edge by said top 29. In this connection, it is to be noted that the pivots 14 of the side frame members 13, or sash frames 12 are located forwardly of the inner edge of the sealing strip 30 so that the uppermost sash 11 is swingable downwardly and inwardly into closing position with the top 29 thereof adapted to swing outwardly and upwardly into clamping engagement with said sealing strip 30. This results in a weather-tight and otherwise efficient seal between the top 29 of the uppermost sash frame 12 and the header 4 of the window frame 1.

A keeper and water-shed bar 32, of stamped out sheet aluminum, is secured by the screws 31 to the bottom of the header rib 10 and to the front edge of the sealing strip 30 and extends forwardly out of the window frame 1 to prevent rain and the like from beating inwardly past the top 29 of the uppermost sash frame 12. The keeper and water-shed bar 32 is of zig-zag form in cross section to fit against the sealing strip 30 and said rib 10. Suitable holes 33, 34 are provided in said sealing strip 30 and bar 32 for the screws 31.

Sealing means is provided between the sides of the sashes 11, when closed, and the front edges of the side stiles 5 comprising the following. The side frame members 13 of each sash frame 12 are provided at the front edges thereof with outwardly and laterally offset channel flanges 36 of rectangular shape in cross section and which overlap the cross bar 15 below the top 29 of the sash frame and depend below the lower ends of said side frame members 13 with open sides confronting. *In the stamping process by which the pivot clips 13 are manufactured from sheet metal, the inner channel flange 36 is upset or struck at a right angle to a side frame member 80 and extends in a direction so as to overlap the stop ribs 8 when mounted thereon. The free end of the outer channel flange 36 is bent at a right angle to form a web 81 while the outer channel flange 36 is returned in a plane parallel to that of the inner channel flange 36 thus forming a channel or slot for receiving a glass pane or louver 41 as is described hereinafter.* The channel flanges 36, when the sash frames 12 are closed overlap and fit flush against the front sides of the side stiles 8 and form weather-tight seals at the sides of the sashes 11. The channel flanges 36 are formed with bottom end gaps 37 in the rear sides thereof and with right angled bottom ears 38 for a purpose presently seen. At the upper ends thereof, the channel flanges 36 are open and each is provided with a front forwardly offset, beveled end portion 39 and an exposed rear side extension 40 between said portion 39 and the flange 21 all for a purpose presently apparent.

A plate glass pane 41 for each sash 11 is fitted at its side edges in channel sealing strips 42 of felt fitted in the channel flanges 36, the bottom edge of the pane 41 resting on the bottom ears 38 are being supported thereby. The channel sealing strips 42 opposite the gaps 37 are cut away, as at 43, so that the lower edge portion of the glass pane 41 is exposed on the rear face thereof from side to side of the pane. At the upper ends thereof the channel sealing strips 42 are provided with front cut-outs 44 so that the fronts of said strips terminate in the portions 39.

A particular feature of my invention is means for forming a weather-tight seal along the upper edge of the pane 41 of each sash 11, and a seal between the lower edge of each sash 11 and the next lower one, all as now to be described.

Figure 4:
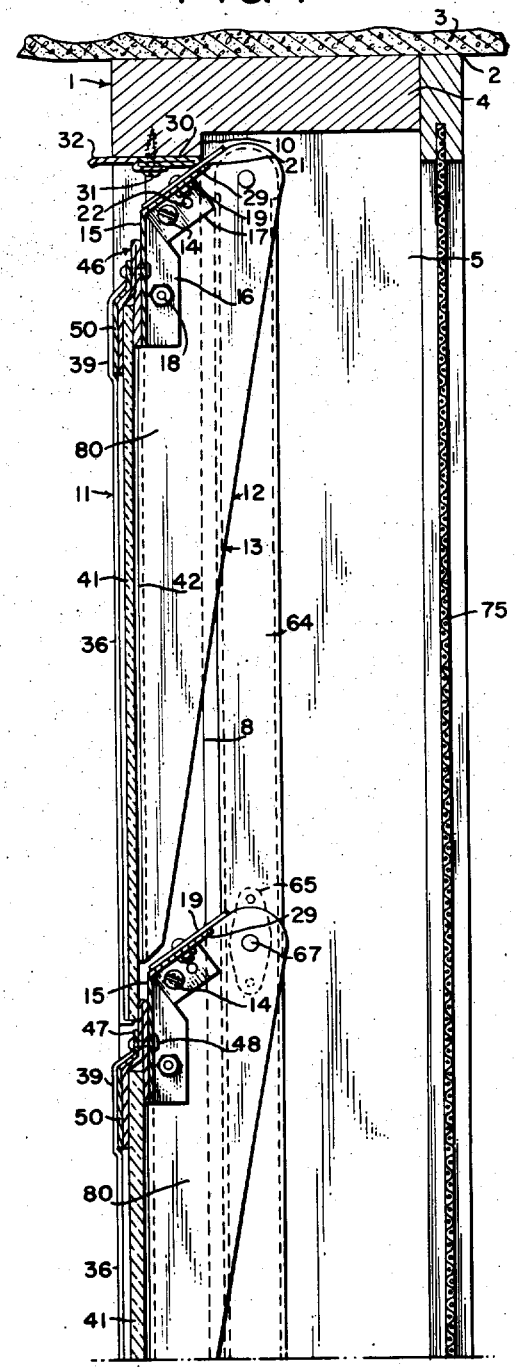
Figure 4 is a view in vertical section of the upper half of the window taken on the line 4—4 of Figure 1 and drawn to the same scale as Figure 3.
Figure 5:
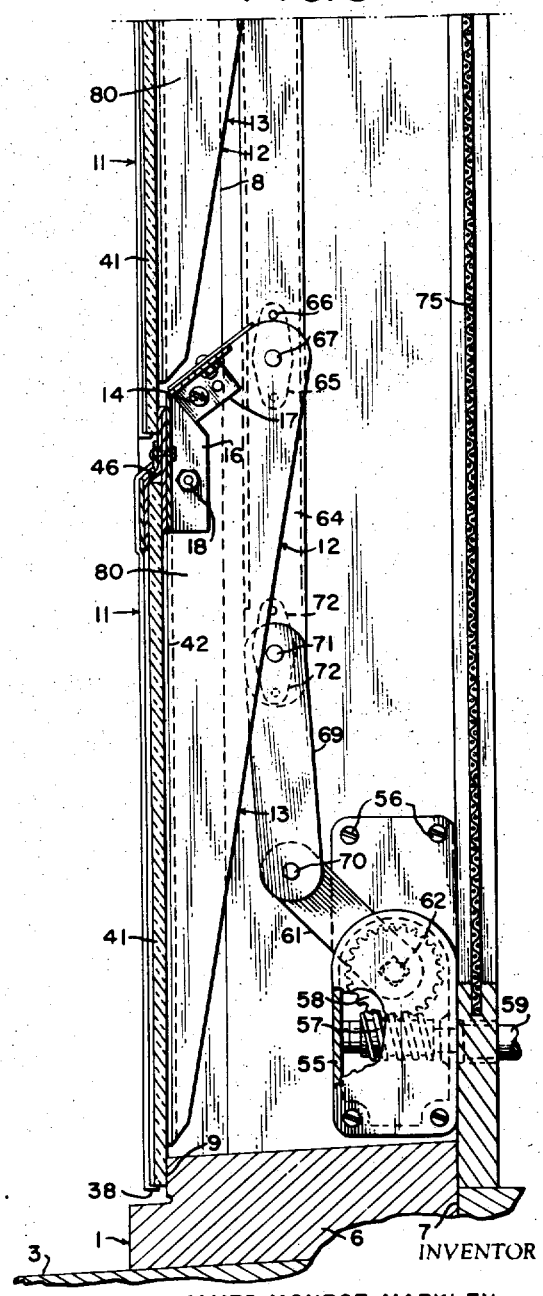
Figure 5 is a similar view of the lower half of the window taken on the line 5—5 of Figure 1.

As best shown in Figures 4, 5 and 6, a folded felt sealing strip 46 is extended along the front side of the cross bar 15 of each sash frame 12 with a double thickness portion 47 riveted, as at 48, to said bar above the pane 41 and said strip below the rivets 48 straddling the upper edge of pane 41. The cut-outs 44 and the open ends of the sealing strips 42 fit against the lower edges of the sealing strips 47. A keeper bar 50 of zig-zag cross-section, and stamped out sheet aluminum, extends along said sealing strip 47 and is riveted in place by the rivets 48, said bar overlying the sealing strip 47 and upper edge of the pane 41 in front of said pane and being spaced downwardly of the sealing strip 47 to leave a double thickness portion of said strip exposed above said keeper bar 50. The ends of the sealing strips 46 and of said keeper bar 50 extend into the channel flanges 36 and both said strips and said bar conformably fit into forwardly offset portions 39 and close the upper ends of the channel flanges 36 with the back of the sealing strip 37 fitting above said ends against the extensions 40 of said channel flanges. Suitable rivet holes 51, 52 are provided in said strip 46 and said bar 50. The exposed lower edge portion of each pane 51, when the sash frames 12 are closed, overlap and fit the sealing strip 46 of the next lower sash frame 12 above the keeper bar 50 so that the sashes 11 are sealed at the lower edges thereof, when closed, without glass engaging glass, or metal, and whereby a perfect and weather-tight seal is formed.

Figure 3:
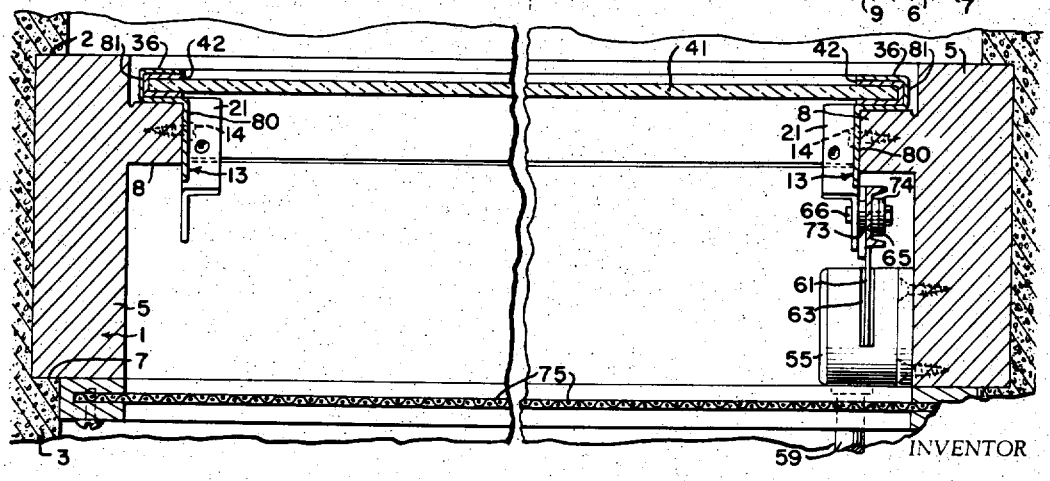
Figure 3 is a view in horizontal section taken on the line 3—3 of Figure 1 and partly broken away and drawn to a larger scale.

Operating mechanism for opening and closing the sash frames 12 is provided comprising a worm-gear casing 55 secured in the bottom of the window frame 1 by screws 56 to one of the side stiles 5 and containing a worm 57 and a worm gear 58, both operative about horizontal axes. The worm 57 is provided with a shaft 59 extending inwardly beyond the window frame 1 for operation by a suitable hand crank 60. A crank arm 61 fast on the shaft 62 of the worm wheel 57, for vertical swinging by said shaft 62 extends toward the lowermost sash 11 through a slot 63 in said casing 55. A vertical, operating channel bar 64 of stamped out sheet aluminum is pivotally connected to the upper ends of the side frame members 13 of the sash frames 12 in rearwardly offset relation to the pivots 14 of said frame members 13. The pivotal connections of the operating bar 64 to said members 13 comprise, in each instance, an aluminum bracket plate 65 which is riveted at 66, to the channel side of said bar 64 with a central lateral pivot stud 67 extending through an upper end aperture 68 in the associated side frame members 13. A link 69 operatively connects the crank arm 61 to the operating bar 64 with a lower end pivoted, as at 70, to said arm 61 and its other end pivoted to the lower end of said bar 64 by a pivoted stud 70 on a bracket plate 72 like the bracket plate 65. Suitable washers 73, 74 may be provided on the pivot studs 67, 71. As best shown in Figure 3 the operating bar 64, the link 69 and the crank arm 61 are disposed between the side frame members 13 of the sash frames 12, at one side of the sashes 11, and the adjacent side stile 5, a space being provided for that purpose by pivoting said sash frame members 13 on the side stop ribs 8.

Figure 2:
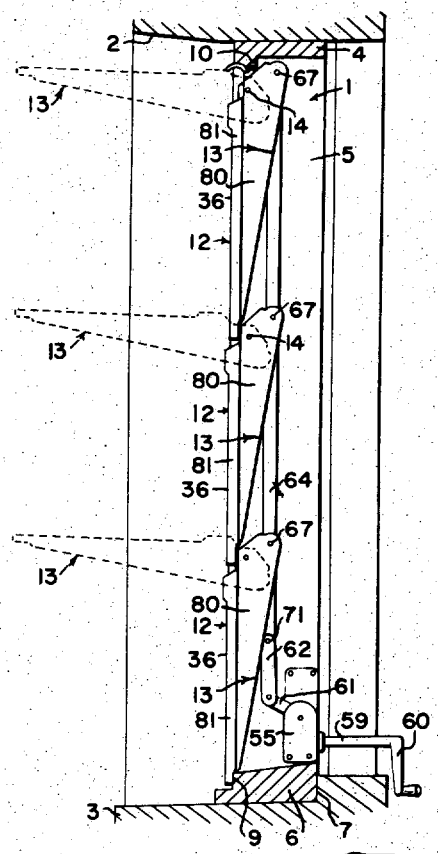
Figure 2 is a view in vertical section taken on the line 2—2 of Figure 1 with the sashes shown open in broken lines.

By operating the hand crank 60, the operating bar 64 may be moved vertically, with lateral play, compensated for by the link 69, to swing the sashes 11 vertically and upwardly from closed position shown in full lines in the drawings into selected open positions with a limit of opening movement, as shown in broken lines in Figure 2, established by engagement of the top 29 of the uppermost sash frame 12 with the keeper and water shed bar 32. With the sash frames 12 closed, the same are effectively sealed in the manner previously explained. The described sash frames 12 provide for sealing the panes 41 therein, without putty, or the like, and by bending the bottom ears 38 of the channel flanges 36 downwardly, said panes 41, with the sealing strips 42 thereon, may be slid upwardly in the channel flanges 36 for installation or replacement purposes and then locked in the sash frames 12, which is to say, in the channel flanges 36, by bending said bottom ears 38 back under the lower edges of the panes 41. As will be seen, installation or replacement of the panes 41 is rendered quick, easy and safe.

Any suitable type of screen 75 may be fitted in the window opening 2 against the window frame 1 in the rear of the said frame.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In a window structure, a window frame having vertical side stop ribs therein, a plurality of vertically spaced sash frames pivoted to said ribs for vertical swinging into open and closed position and including plate-like side frame members fitting between said ribs with channel flanges extending along one edge and glass panes fitted at side edges in said side flanges, said flanges being laterally offset from said members outwardly beyond the outer sides thereof and fitting flat against said ribs and sealing said sash frames when closed at the sides thereof, said panes being wider than the distance between said members to fit said side edges in said channel flanges.

2. In a window structure, a window frame forming an opening, a plurality of vertically spaced open bottom sash frames movable in said window frame into open and closed position and including plate-like side frame members with front edge channel flanges offset outwardly beyond the outer sides of said members and overlapping and fitting against the sides of the window frame when the sash frames are in closed position, glass panes wider than said opening and having side edges fitting in said channel flanges, upper cross bars connecting the side frame members of the sash frames, said flanges having lower end portions depending below the side members and open at the rear thereof and exposing the lower edge portions of said panes opposite said upper cross bars, and sealing strips extending along said cross bars in front thereof with ends inserted in said channel flanges, the exposed lower edge portions of said panes overlapping and seating against said sealing strips when said sash frames are closed.

3. In a window structure, a window frame forming an opening, a plurality of vertically spaced open bottom sash frames movable in said window frame into open and closed position and including plate-like side frame members with front edge channel flanges offset outwardly of the outer sides thereof, glass panes wider than said opening and having side edges fitting in said channel flanges, upper cross bars connecting the side frame members of the sash frames, said flanges having lower end portions depending below the side members and overlapping said window frame and open at the rear thereof to expose the lower edge portions of said panes opposite said upper cross bars, and sealing strips extending along said cross bars in front thereof with ends inserted in said channel flanges, the exposed lower edge portions of said panes overlapping and seating against said sealing strips when said sash frames are closed, said sealing strips being folded to straddle and seal the upper edges of said panes between said side frame members.

4. In a window structure, a sash frame including plate-like side frame members having front edge channel flanges offset outwardly of the outer sides of said members, a glass pane wider than the distance between said members with side edges inserted in said flanges, an upper cross bar connecting said members in overlapping relation to the upper edge of said pane, and a felt sealing strip folded upon itself and fixed along said bar above said upper edge of the pane with edges straddling said upper edge portion of the pane and inserted at the ends of said strip into said channel flanges to seal said pane along said upper edge portion.

5. In a window structure, a sash frame including plate-like side frame members having front edge channel flanges offset outwardly beyond the outer sides of said members, a glass pane wider than the distance between said members with side edges inserted in said flanges, an upper cross bar connecting said members in overlapping relation to the upper edge of said pane, a felt sealing strip folded upon itself and fixed along said bar above said upper edge of the pane with edges straddling said upper edge portion of the pane and inserted at the ends of said strip into said channel flanges to seal said pane along said upper edge portion, and a rigid keeper bar secured to said cross bar over said strip and extending at its ends into said flanges.

6. In a window frame including a header, a sash frame including side sash frame members pivoted at upper ends thereof on the window frame adjacent said header for vertical swinging of said sash from a closed position outwardly of said window frame into open position, an upper front cross bar on said sash frame of obtuse angled cross section forming a top for said sash frame inclining when said sash is closed downwardly and outwardly of said window frame to shed rain, said cross bar having a vertical portion below said top, a horizontal sealing strip on said header having edge engagement with said top when the sash frame is closed, a keeper and water shed bar extending outwardly of said sash frame and attached to said header in underlying and engaging relation to said horizontal sealing strip and engaged by said top when said sash frame is open, and a sash pane in said sash frame overlapping said vertical portion.

*7. In a window structure having a frame and a plurality of vertically swingable louvers and means pivotally mounting each of said louvers on said frame, said means comprising a pair of side frame members, a pivot pin pivotally securing each of said side frame members to said frame in substantially the same horizontal plane, a flange member mounted along one edge on each of said side frame members and extending in a direction away from each other, said flange members adapted to abut against said frame only when said louvers are in a closed position, a web portion extending along the opposite edge of each of said flange members in a direction away from said frame said web portions each lying in a plane in spaced relation to a plane passing through said side frame members, and a further flange member mounted on one edge along each of said web portions and extending in a direction toward each other thereby forming a channel for receiving an edge portion of said louver.*

*8. A pivot clip for a vertically swingable louver comprising a side frame member, a flange member mounted on said side frame member and extending at a substantially right angle, a web portion extending along said flange member at substantially right angle to said flange member, said web portion lying in a plane in spaced relation to a plane passing through said side frame member a further flange member mounted along said web portion at a substantially right angle and extending in a reverse direction as said first named flange member to form a channel for receiving an edge portion of the louver.*

*9. A pivot clip for a vertically swingable louver comprising a side frame member adapted to be pivotally mounted on a window frame, a flange member mounted on said side frame and extending at a substantially right angle, a web portion extending along said flange member at a substantially right angle to said flange member, said web portion lying in a plane substantially parallel with and in spaced relation to that of said side frame member, a further flange member extending along said web portion at a substantially right angle to said web portion and in a direction toward a plane passing through said side frame member thereby forming a channel for receiving an edge portion of the louver.*

*10. A pivot clip for a vertically swingable louver comprising an elongated channel portion adapted to receive an edge portion of the louver, said elongated channel portion having an upper end, plate-like support means for said channel portion extending beyond said upper end of said channel portion, said channel portion having a pair of substantially parallel flanges joined along one edge by a web portion, one of said flanges extending in a direction away from a plane passing through said plate-like support means and said other of said flanges extending in an opposite direction of said one of said flanges, said web portion lying in a plane spaced from the plane passing through said support means, and pivot means mounted on said upper end of said plate-like support means.*

*11. In a window structure having a frame and a plurality of vertically swingable louvers and means pivotally*

*mounting each of said louvers on said frame, said means comprising a pair of elongated side frame members, said elongated side frame members having an upper end, a pivot pin pivotally securing each of said side frame members adjacent said upper end to said frame in substantially the same horizontal plane, a flange member mounted along one edge on each of said side frame members and extending in a direction away from each other, said flange members adapted to abut against said frame when said louvers are in a closed position, means mounted on said flange members for receiving side edges of said louvers, an operating bar slidably mounted along said frame, pivot means securing said operating bar and one of said side frame members between said pivot pin and said upper end of said one of said side frame members and operating means connected to said operating bar whereby said flange members describe an arc outwardly and upwardly of said frame upon actuation of said operating means.*

References Cited in the file of this patent or the original patent

UNITED STATES PATENTS

| | | |
|---|---|---|
| 997,677 | Ivey | July 11, 1911 |
| 1,029,217 | Newpher | June 11, 1912 |
| 1,424,410 | Hopewell | Aug. 1, 1922 |
| 1,488,345 | Jenkins | Mar. 25, 1924 |
| 1,960,763 | Waddell | May 29, 1934 |
| 2,137,426 | Thompson | Nov. 22, 1938 |
| 2,311,950 | Mader | Feb. 23, 1943 |
| 2,322,700 | Mussey | June 22, 1943 |
| 2,371,154 | Cuthill | Mar. 13, 1945 |
| 2,422,704 | Russell et al. | June 24, 1947 |
| 2,457,871 | Cooper | Jan. 4, 1949 |
| 2,503,421 | Sherard | Apr. 11, 1950 |
| 2,530,708 | Loewenthal | Nov. 21, 1950 |
| 2,565,447 | Andresen | Aug. 21, 1951 |